United States Patent
Hartnett et al.

(10) Patent No.: US 10,089,467 B1
(45) Date of Patent: Oct. 2, 2018

(54) STATIC ANOMALY-BASED DETECTION OF MALWARE FILES

(71) Applicant: Malwarebytes Inc., Santa Clara, CA (US)

(72) Inventors: Andrew Thomas Hartnett, Pittsburgh, PA (US); Douglas Stuart Swanson, Coral Springs, FL (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 15/603,337

(22) Filed: May 23, 2017

(51) Int. Cl.
G06F 21/56 (2013.01)
G06N 99/00 (2010.01)
G06F 21/51 (2013.01)

(52) U.S. Cl.
CPC .......... G06F 21/568 (2013.01); G06F 21/566 (2013.01); G06N 99/005 (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,440,723 A | 8/1995 | Arnold et al. | |
| 7,334,005 B2 | 2/2008 | Sobel | |
| 8,074,115 B2 | 12/2011 | Stolfo et al. | |
| 8,108,929 B2 | 1/2012 | Agrawal et al. | |
| 9,298,920 B1 | 3/2016 | Mason et al. | |
| 9,319,423 B2 | 4/2016 | Jover et al. | |
| 9,430,646 B1 * | 8/2016 | Mushtaq | G06F 21/554 |
| 9,805,115 B1 * | 10/2017 | Satish | G06F 17/30705 |
| 2005/0108562 A1 | 5/2005 | Khazan et al. | |
| 2009/0158430 A1 * | 6/2009 | Borders | G06F 21/552 726/23 |
| 2012/0174227 A1 * | 7/2012 | Mashevsky | G06F 21/562 726/24 |
| 2013/0145471 A1 * | 6/2013 | Richard | G06F 21/564 726/24 |
| 2014/0283066 A1 * | 9/2014 | Teddy | G06F 21/51 726/23 |
| 2015/0220735 A1 * | 8/2015 | Paithane | G06F 21/566 726/23 |

(Continued)

OTHER PUBLICATIONS

CN103369555A. English Translation. 2013.*

*Primary Examiner* — Venkat Perungavoor
(74) *Attorney, Agent, or Firm* — Fenwick & West LLP

(57) ABSTRACT

A protection application detects and remediates malicious files on a client. The protection application trains models using known samples of static clean files, and the models characterize features of the clean files. A model may be selected based on metadata obtained from a target file. By processing features of the clean files and features of the target file, the model may generate an anomaly score indicating a level of dissimilarity between the target file and the sample. The protection application compares the anomaly score to one or more threshold scores to classify the target file. Additionally, the target file may be provided to a security server to check against a whitelist or blacklist for classification. Responsive to a classification as malicious, the protection application remediates the target file on the client.

17 Claims, 4 Drawing Sheets

(56) References Cited

U.S. PATENT DOCUMENTS

| | | | |
|---|---|---|---|
| 2015/0326601 A1* | 11/2015 | Grondin | G06Q 10/0635 |
| | | | 726/25 |
| 2016/0366158 A1* | 12/2016 | Feng | H04L 63/1416 |
| 2016/0381041 A1 | 12/2016 | Bean et al. | |
| 2016/0381042 A1* | 12/2016 | Zhang | H04L 63/145 |
| | | | 726/24 |
| 2017/0006045 A1* | 1/2017 | Kivva | H04L 63/145 |
| 2017/0085585 A1* | 3/2017 | Morkovsk | H04L 63/1425 |

* cited by examiner

STATIC ANOMALY-BASED DETECTION OF MALWARE FILES

FIELD OF ART

The present disclosure generally relates to preventing malware and more specifically to anomaly-based detection and remediation of files on a client.

BACKGROUND

It is traditionally difficult to detect malware due to the constantly evolving nature of different types of malware. Experts may manually determine rules for detecting a particular instance of malware after identifying and studying that particular instance. However, attackers can develop new instances of malware that are not detectable by known rules. It is also challenging to predict characteristics of future iterations of malware or other types of anomalous files. In addition, current systems may require executing an application on a client to determine whether it is actually malicious, though this may not be ideal since executing malware can already cause undesirable effects to the client.

SUMMARY

A method detects anomalous files by determining anomalies between target files and a sample of clean files. A file on a client is obtained for classification, and metadata associated with the file is also obtained. A model from set of multiple models is selected based on the metadata, where the models each are trained using a sample of clean files and characterize features of the sample of clean files. The file is applied to the selected model to generate an anomaly score of the file. The anomaly score indicates a level of dissimilarity between features of the file and the features of the sample of clean files of the selected model. The file is classified as anomalous based on the anomaly score, for example, if the anomaly score is greater than a threshold score. Responsive to the classification, the file is remediated by the client, thus preventing suspected malware threats.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A protection application generates anomaly scores to classify files on a client and remediates files classified as anomalous. An anomaly score indicates a level of dissimilarity between a target file and a known sample of clean files, i.e., files that are non-anomalous and not associated with known malware. Thus, the protection application can detect potentially malicious files suspected (or known) to be associated with malware by determining files that are anomalous relative to the sample of clean files. Since there is a limited number of known malicious files associated with malware, it may be difficult to train a model to reliably determine whether a target file is similar to other malicious files, even with supervised machine learning. However, there is a large number of clean files available to train a model to detect dissimilarities, i.e., anomalies, between a target file and the known sample of clean files. Further, clean files are typically updated at a slower rate than malicious files, and static features of clean files may be tied to certain functionalities. Thus, it is more resource-efficient to train models using clean files and the trained models may be more robust and long-lived.

The protection application furthermore beneficially detects anomalous files based on their static characteristics and thus need not execute the files to perform the detection. In other words, the protection application processes "static" files rather than running applications.

Figure 1:
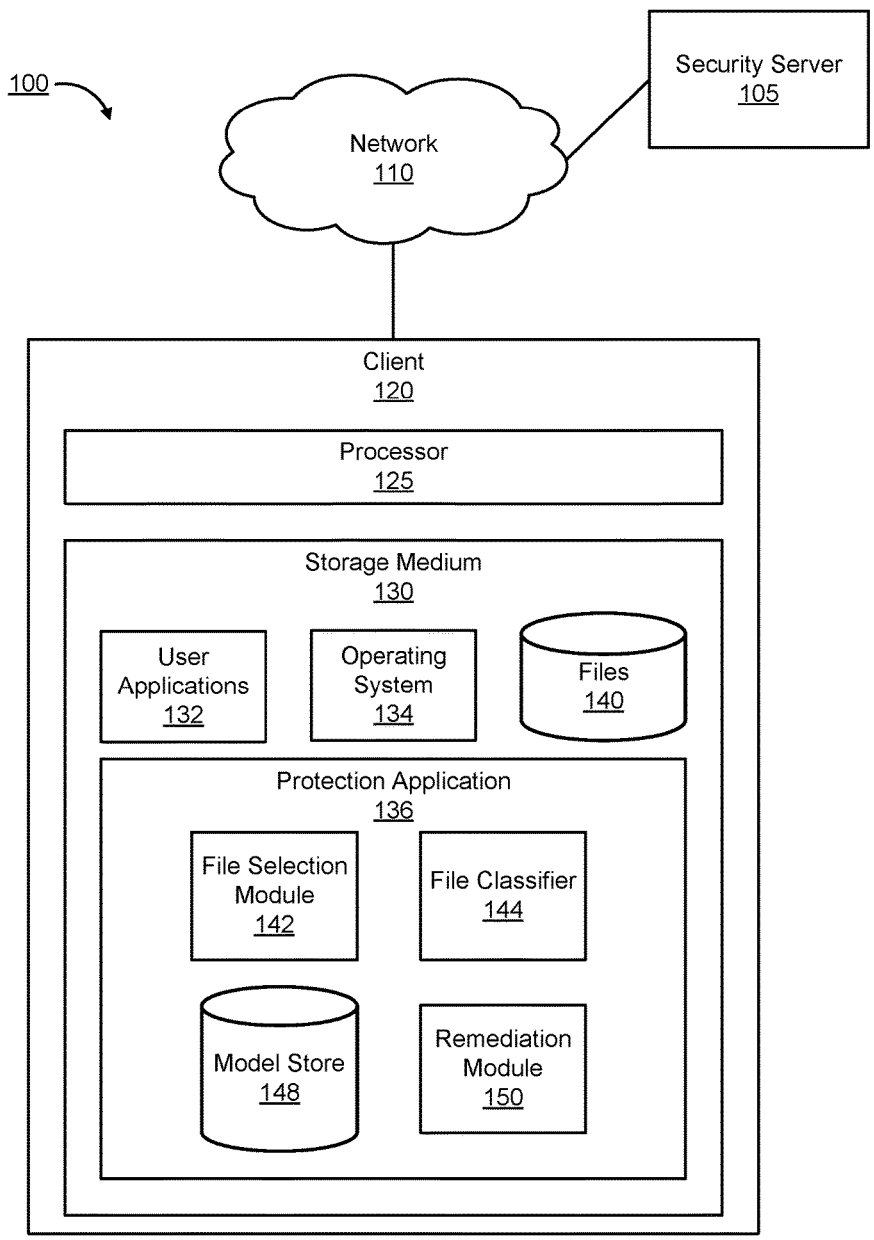
FIG. 1 is a system diagram illustrating an example embodiment of an environment in which a protection application executes.

FIG. 1 is a high-level block diagram illustrating a system environment 100 for a protection application. The system environment 100 comprises a security server 105, a network 110, and a client 120 (also referred to as a client device 120). For simplicity and clarity, only one security server 105 and one client 120 are shown; however, other embodiments may include different numbers of security servers 105 and clients 120. Furthermore, the system environment 100 may include different or additional entities.

The security server 105 is a computer system configured to store, receive, and transmit data to clients 120 or to other servers via the network 110. The security server 105 may include a singular computing system, such as a single computer, or a network of computing systems, such as a data center or a distributed computing system. The security server 105 may receive requests for data from clients 120 and respond by transmitting the requested data to the clients 120. The security server 105 includes a database of information about known malware (e.g., a blacklist), clean files (e.g., a whitelist), or both. Further, the security server 105 may lookup files in whitelists or blacklists of the database and provide results of the lookup to clients 120. The security server 105 is described in further detail below with reference to FIG. 2.

The network 110 represents the communication pathways between the security server 105 and clients 120. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data as well as transmitting and receiving data via a network 110. For example, a client 120 may be a desktop computer, a laptop computer, a mobile phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, and external memory storage devices. In addition to storing program instructions, the storage medium 130 stores files 140, as well as various data associated with operation of the operating system 134, protection application 136, and other user applications 132.

In one embodiment, the storage medium 130 comprises a non-transitory computer-readable storage medium. Various executable programs (e.g., operating system 134, protection application 136, and user applications 132) are each embodied as computer-executable instructions stored to the non-transitory computer-readable storage medium. The instructions, when executed by the processor 125, cause the client 120 to perform the functions attributed to the programs described herein.

The operating system 134 is a specialized program that manages computer hardware resources of the client 120 and provides common services to the user applications 132. For example, a computer's operating system 134 may manage the processor 125, storage medium 130, or other components not illustrated such as, for example, a graphics adapter, an audio adapter, network connections, disc drives, and USB slots. A mobile phone's operating system 134 may manage the processor 125, storage medium 130, display screen, keypad, dialer, wireless network connections and the like.

Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the user. Examples of user applications 132 may include a word processor, a spreadsheet application, and a web browser. In some cases, a user application 132 can be a source of malware and be associated with one or more of the files 140 stored on the client 120. The malware may be executed or installed on the client 120 when the user application 132 is executed or installed, or when an associated malicious file is accessed.

The protection application 136 detects and remediates potentially malicious files installed or otherwise stored on the client 120. To determine whether a given file is potentially malicious, the protection application 136 selects a model to generate an anomaly score for the given file that represents a measure of dissimilarity between the given file and known clean files. Files that are highly anomalous relative to the clean files (e.g., have an anomaly score exceeding a predefined threshold) are identified as being potentially malicious. In addition to generating the anomaly score using the model, the protection application 136 may access the security server 105 via the network 110 to perform a check against a whitelist or blacklist prior to classifying the file as being malicious or clean and taking appropriate remedial action, if necessary.

The protection application 136 includes a file selection module 142, a file classifier 144, a model store 148, and a remediation module 150. Alternative embodiments may include different or additional modules or omit one or more of the illustrated modules.

The file selection module 142 selects files for classification by the protection application 136. During a selection process, the file selection module 142 obtains metadata associated with a given file from the files 140 on the client 120. The metadata includes a set of information that describes the given file. For example, the metadata may include file header information indicating a file format (e.g., a file having a portable executable (PE) format, portable document format (PDF), image format, another type of executable format, etc.), file size, file location, file source, or other parameters. In some embodiments, the file selection module 142 stores content of the given file into a buffer and obtains the metadata by parsing the contents from the buffer. The file selection module 142 may use the obtained metadata to determine a subclass of the given file. The subclass is a label with which the file selection module 142 may assign or tag the given file based on its metadata. Example subclasses of file types include portable executables (e.g., files with the .exe extension, dynamic-link libraries (DLL), and drivers), documents (e.g., files with extensions such as .doc, .docx, .txt, etc.), PDFs, images, scripts (e.g., JavaScript (.js), Visual Basic Scripts (.vbs), WINDOWS® script files (.wsf), etc.), among other types of files. The protection application 136 may use the assigned subclass for other classification steps further described below.

Additionally, the file selection module 142 may apply one or more filters to filter out files that can be deemed harmless without further processing and to select files for further processing. In an embodiment, different filters may be applied to different files depending on the determined file subclass. For example, the file selection module 142 may include a different filters each associated with different file subclasses and may use the obtained subclass (or unprocessed metadata) to select a filters to apply each given file. Alternatively, a plurality of different filters may be applied to all input files, with each filter designed to filter the files in different ways. For instance, a first filter for executable-type files may filter files according to different filtering criteria than a second filter for non-executable-type files. The filtering criteria for each filter may be based on a local whitelist of known clean files. Here, each filter passes files that do not match any of the known clean files on the respective whitelist associated with the filter. In other embodiments, a filter may filter out (or pass) files based on criteria such as whether or not a file is digitally-signed, has file size in a target range, includes structured exception handling information, or was previously classified as clean by the protection application 136. Only the files that pass through the filter are further processed for potential classification as being malicious, as further described below. Filtering the files 140 may be advantageous because, by reducing the number of files passed down the pipeline for further processing, the protection application 136 may reduce the amount of computational resources required by the client 120 for classification. In an embodiment, only a relatively small percentage of files pass through the filter.

The model store 148 stores a plurality of anomaly score models used by the file classifier 144 to classify files as malicious or clean. Each anomaly score model comprises a function that generates an anomaly score based on a set of input features (e.g., an input feature vector) derived from an input file and a set of model parameters. The features are measurable properties of files that characterize the files in a way that enables similarities or dissimilarities between files to be measured. Features may be properties represented by a numerical scale such as a checksum value of a file, or binary properties such as whether the checksum value is valid. In one embodiment, features for a PE file, i.e., a file having a portable executable (PE) format, can include a number of writeable or executable non-header sections of the PE file, a number of unknown or uncommon sections, section characteristics, or an amount of resources allocated to certain sections. The features may also be based on heuristics such as whether the PE checksum is valid or whether a rich string is valid. In an embodiment, the rich string is a particular portion of a PE file header that may be ignored by an operating system 134 and, as a result, may be used by malware to store custom data such as decryption keys. In some embodiments, all of the features may be derived without executing the files of the sample, but instead by performing a static analysis of the files.

The model parameters for each model may be derived from reference features (e.g., reference feature vectors) associated with a set of reference files comprising known clean files. The model parameters may include, for example, a mean feature vector μ representing average values for each feature in the set of reference files, and a covariance matrix Σ representing the variance of each feature and the covariance between all feature pairs. In other words, the covariance matrix Σ represents or describes the spread of the data in the feature space.

The function computes an anomaly score that provides a measure of how anomalous (e.g., how dissimilar) the input file is from the set of known clean files based on their respective features. For instance, an anomaly score model may specify the following function to determine an anomaly score p(x) for a target file having a feature vector x, where n is the number of features employed by the model:

$$p(x) = \frac{1}{(2\pi)^{\frac{n}{2}}|\Sigma|^{\frac{1}{2}}} \exp\left(-\frac{1}{2}(x-\mu)^T \Sigma^{-1}(x-\mu)\right)$$

In this function, distances are determined between each feature of the input feature vector x and corresponding mean features of the mean feature vector and the distances are combined to generate the anomaly score p(x). The selected model generates the anomaly score based on the differences and the variances for the features of the sample, so that the anomaly score may be normalized based on the variances, which may vary from sample-to-sample.

Each of the different models in the model store 148 may specify a different function, different parameters, or different features sets to which the function is applied. Each of the different models may be associated with a different subclass of files and may be configured specifically to detect anomalies within that file subclass. For example, the different models may be trained with reference files within a particular subclass so that the model produces an anomaly score relative to a particular subclass of files. In an embodiment, the model store 148 may receive new anomaly score models or periodic updates to existing anomaly score models from the security server 105. An example of a training module for training different models in the model store 148 is described in further detail below with respect to FIG. 2.

The file classifier 144 uses the obtained subclass of an input file to select one of the multiple anomaly score models suitable to score the input file. For example, the file classifier 144 selects a model associated with the subclass that corresponds to the assigned subclass of the input file to be scored. In one embodiment, the file classifier 144 generates features for the input file, and applies the selected model to the input file to generate the anomaly score, for example, by applying the function of the selected model to the features using the parameters (e.g., expected value and variances) of the selected model.

The file classifier 144 compares the anomaly scores against one or more threshold scores to classify the files. In one embodiment, the file classifier 144 classifies a file as malicious responsive to determining that an anomaly score for the file is greater than a threshold score, and clean otherwise. In some embodiments, in addition to using the threshold score, the file classifier 144 provides the file to the security server 105, and classifies the file based on a check against a cloud whitelist or blacklist performed by the security server 105 (further described below with reference to FIG. 2). For example, if the anomaly score is above the threshold score, the file is compared against a cloud whitelist and classified as malicious if it does not match the whitelist (and is otherwise classified as clean). If the anomaly score is below the threshold score, the file is compared against a cloud blacklist and classified as malicious if it matches the blacklist (and is otherwise classified as clean).

In another embodiment, multiple thresholds may be used (e.g., three thresholds including a lower threshold, a center threshold, and an upper threshold). Here, the file classifier 144 classifies a file as malicious responsive to determining that an anomaly score for the file is greater than (or equal to) an upper threshold score. On the other hand, the file classifier 144 classifies the file as clean responsive to determining that the anomaly score is less than a lower threshold score. Responsive to determining that the anomaly score is less than the upper threshold score and greater than (or equal to) a center threshold score, the file classifier 144 provides the file to the security server 105 for comparison against a cloud whitelist of known clean files. The file classifier 144 classifies the file as malicious responsive to receiving an indication that the file is not on the cloud whitelist and classifies as clean if the file is on the whitelist. In addition, responsive to determining that the anomaly score is less than the center threshold score and greater than (or equal to) the lower threshold score, the file classifier 144 provides the file to the security server 105 for comparison against a cloud blacklist of known malware files. The file classifier 144 classifies the file as malicious responsive to receiving an indication that the file is on the cloud blacklist and classifies the file as clean if it is not on the blacklist. In some use cases, the lower and upper threshold scores may be between one to three standard deviations below and above the center threshold score, respectively. The file classifier 144 may use the lower, center, or upper threshold scores to reduce load on the security server 105 by decreasing the amount of files that are provided to be checked by the security server 105.

The remediation module 150 remediates files that are classified as malicious by the file classifier 144. In particular, the remediation module 150 may perform remediation by removing a malicious file from the client 120, quarantining the malicious file on the client 120, or providing a notification to a user of the client 120 indicating that the malicious file is suspected to be associated with malware. The notification may also include information about the malicious file such as a file source or risk severity level proportional to the anomaly score of the malicious file. In one embodiment, the remediation module 150 provides a user of the client 120 with an option to remove a suspected malicious file. Responsive to the user selecting to retain rather than remove the suspected malicious file, the remediation module 150 may determine that the classification is a false positive provide this feedback to the security server 105 to re-train an anomaly score model.

Figure 2:
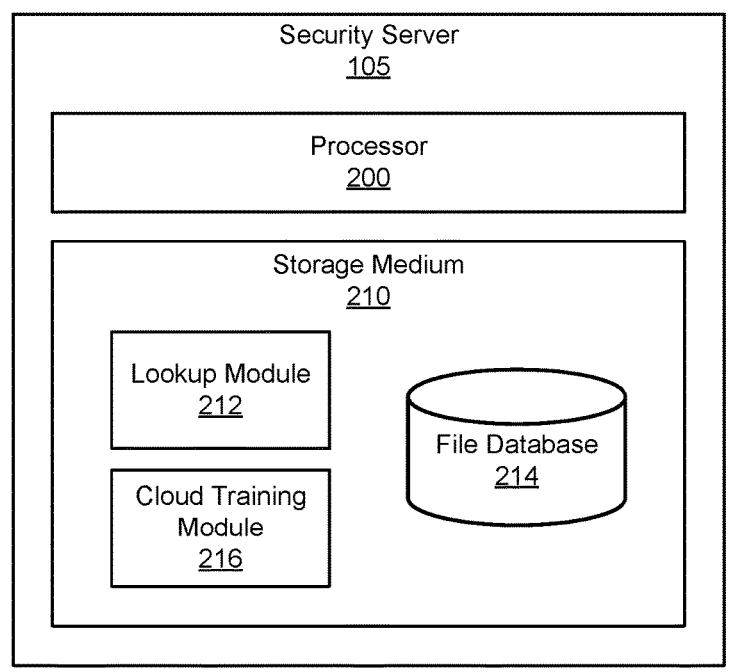
FIG. 2 is a block diagram illustrating an example embodiment of a security server.

FIG. 2 is a block diagram illustrating an example embodiment of a security server 105. The security server 105 includes a processor 200 for manipulating and processing data, and a storage medium 210 for storing data and program instructions associated with various modules. The storage medium 210 includes a lookup module 212, a file database 214, and a cloud training module 216. Alternative embodiments may include different or additional modules or omit one or more of the illustrated modules.

The lookup module 212 checks files based on information received from the file classifier 144 of a protection application 136 running on the client 120. For each file, the lookup module 212 performs a lookup in the file database 214 to determine if the file is associated with information about known malicious files (e.g., related to malware) or clean files. The lookup module 212 provides a result of the lookup to the file classifier 144. The result may indicate that the file is associated with a known malicious file on a cloud blacklist, the file is associated with a known clean file on a cloud whitelist, or the file does not match with either the cloud blacklist or whitelist. The cloud whitelist may be based on a more extensive database of files, relative to the previously described local whitelist of the file selection module 142 on the client 120. By checking against the cloud whitelist, the lookup module 212 may reduce the number of false positives (i.e., clean files erroneously classified as malicious) because, in some exceptions, clean files may not closely resemble other typical clean files.

The cloud training module 216 may establish training sets of clean files and learn model parameters for a plurality of different models corresponding to different file classes. For example, the training set may obtain metadata for clean files and group the clean files into training sets of separate classes based on the metadata as described above. The cloud training module 216 generates features for the files in each training set. The type or number of features may be different in each training set corresponding to the different classes. For each class, the cloud training module 216 trains a separate anomaly score model to learn the respective model parameters using the features derived from the clean files in the training sets for each class. Thus, the different models may be configured to generate anomaly scores for input files of different file classes relative to clean files of the same subclass as the input file. In an example using subclasses that corresponding to the file sources of files, a first model may be trained using a sample of files downloaded from an online server file source (and thus assigned to a first subclass), while a second model is trained using another sample of files obtained from a local disk file source on clients 120 (and thus assigned to a second subclass different than the first subclass). Thus, the first model may generate more accurate anomaly scores for files downloaded from the online server than for files obtained from the local disk (and vice-versa for the second model) because the features are customized for different types of file sources.

In an example, the cloud training module 216 uses the following equations to determine the model parameters including an expected value (i.e., mean) $\mu$ and covariance matrix $\Sigma$:

$$\mu = \frac{1}{m}\sum_{i=1}^{m} x^{(i)}$$

$$\Sigma = \frac{1}{m}\sum_{i=1}^{m} (x^{(i)} - \mu)(x^{(i)} - \mu)^T$$

where $x^{(i)}$ is a vector representing the set of features for a sample clean file i in the training set of m files and has a dimension equal to the number of features. The mean feature vector $\mu$ represents average feature scores for each of the features across the training set. Further, the covariance matrix $\Sigma$ represents the variance of each feature and the covariance between all feature pairs (i.e., extending across multiple dimensions), and may also capture how pairs of features vary together.

The cloud training module 216 may optimize the model parameters in each model by applying the model to one or more test files known to be malicious or clean files. The performance of the model can be measured based on correct classifications of malicious test files and a number of false positives (e.g., classification of clean test files as malicious). Model parameters, the selected function, or the feature sets used in each model may then be adjusted to improve performance.

The cloud training module 216 may distribute the trained models to protection applications 136 of clients 120, as well as periodically update the distributed models. Beneficially, since clean files generally experience slower rates of change than do malicious files, the anomaly score models do not need to be frequently re-trained with updated samples of clean files.

Figure 3:
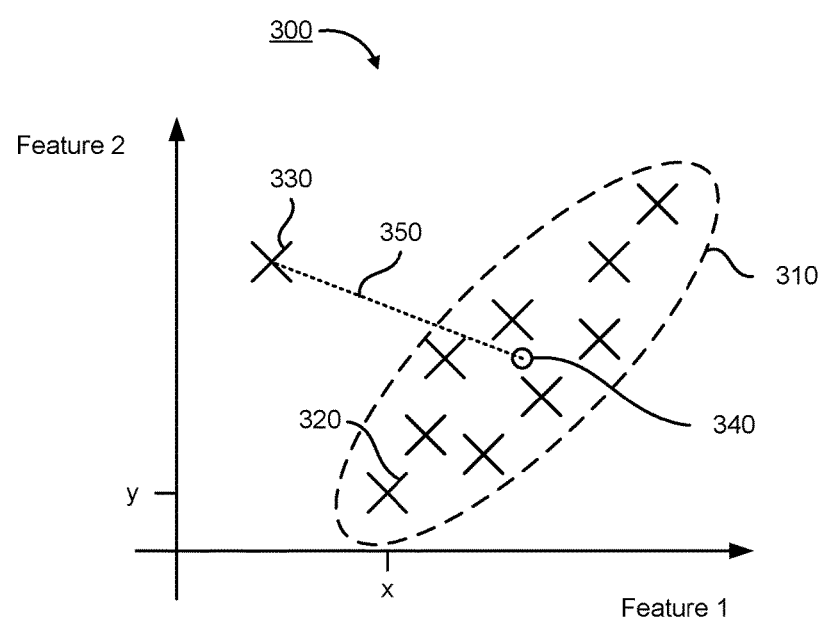
FIG. 3 is a diagram characterizing files that illustrates a process for generating anomaly scores.

FIG. 3 is a diagram 300 characterizing files that illustrates a process for generating anomaly scores. In the embodiment shown in FIG. 3, the diagram 300 includes a graph of points representing a sample of known clean files and a target file to be scored by an anomaly score model. To characterize the sample, features of the sample are represented by the two axis of the graph. In particular, the x-axis and y-axis represent feature 1 and feature 2, respectively, though in other embodiments, anomaly score models use many more features, e.g., hundreds of features. For each file of the sample, a multi-dimensional feature score is represented by a point on the graph. As an example, the point 320 corresponds to a file of the sample having a feature score of "x" for feature 1 and a feature score of "y" for feature 2. The points of the clean files of the sample are within dotted lines of the contour 310, illustrating that the clean files are generally similar (non-anomalous) to each other based on the characterized features. The contour 310 may represent the multivariate Gaussian distribution of the points of the sample, which is determined by the anomaly score model based on the feature scores.

The anomaly score may be represented in the graph as a distance 350 between the point 330 representing the target file and the mean 340 of the multivariate Gaussian distribution, or the "peak of normal." The mean 340 may be an average of one or more feature scores of the sample. As the distance 350 (also referred to as a Mahalanobis distance or a Euclidean distance) increases, the point 330 is a greater number a standard deviations away from the mean 340, thus indicating that the target file is more dissimilar to the sample.

The diagram 300 is used to illustrate conceptually how suspected malicious file may be distinguished from a sample of clean files. That is, the anomaly score models in the model store 148 do not necessarily use a graph having two axis, each representing a different feature, to determine anomaly scores. Rather, the anomaly score models may be implemented using known types of machine learning techniques or models such as decision trees, support vector machines (SVMs), neural networks (e.g., autoencoders), boosted/bagged ensemble models, isolation forests, and the like. Additionally, the anomaly score models may characterize any number of features of the sample, e.g., hundreds of different features.

Figure 4:
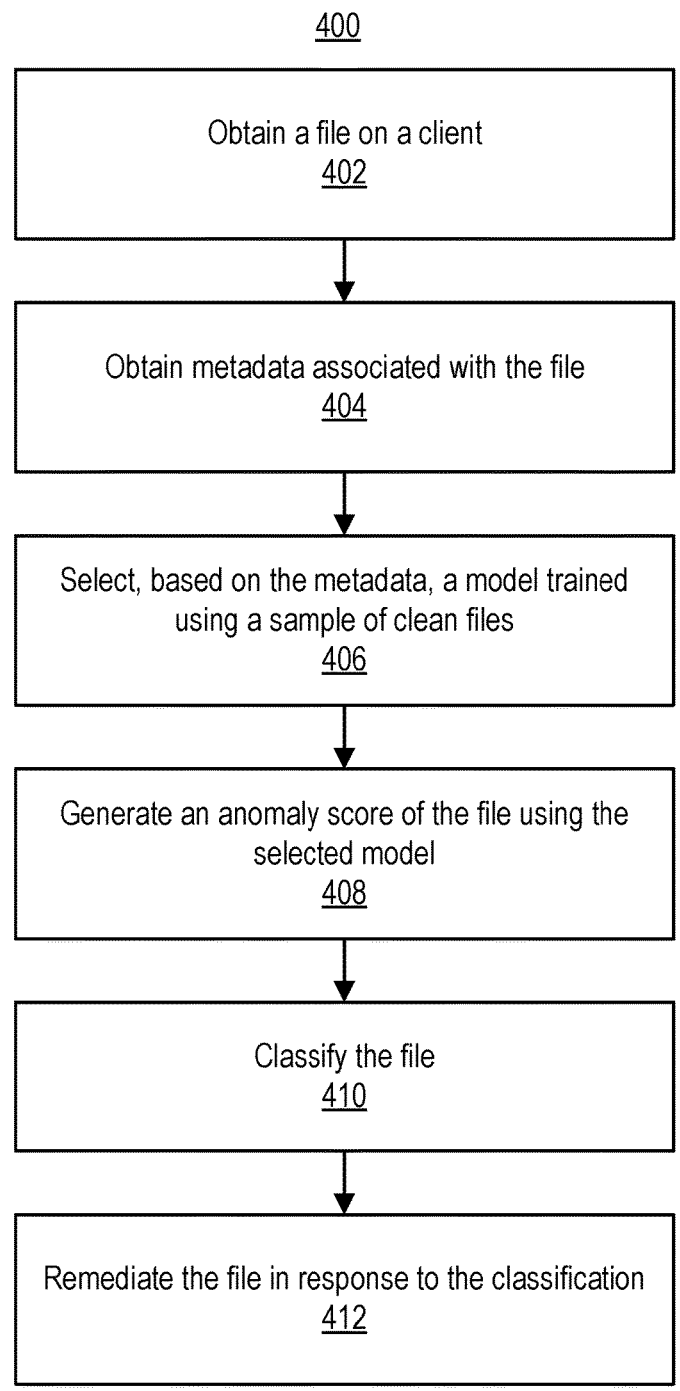
FIG. 4 is a flowchart illustrating an embodiment of a process for classifying files based on an anomaly score.

FIG. 4 is a flowchart illustrating an embodiment of a process 400 for classifying files based on an anomaly score. A protection application 136 of a client 120 stores multiple anomaly score models (e.g., received from a security server 105) in the model store 148. The file selection module 142 obtains 402 a file on the client 120 and obtains 404 metadata associated with the file used to determine a file class. The file selection module 142 may optionally apply a filter to determine whether to proceed to further steps of the classification process. Based on the class, the file classifier 144 selects 406 a model from the multiple anomaly score models that are trained by the cloud training module 216 using samples of clean files and characterize the features of the sample of clean files. The selected model generates 408 an anomaly score of the file. The file classifier 144 classifies 410 the file based on the anomaly score. Responsive to a classification of the file as anomalous, the remediation module 150 remediates 412 the file.

In some embodiments, the file classifier 144 may perform rules-based classification of files before, after, or in parallel with the anomaly score-based classification process. In the rule-based classification, the file classifier 144 applies a set of rules (e.g., malware definitions) to files to determine whether any of the files are malicious, where the rules are designed to identify specific known malware files. Example of rules may include detecting a malicious file if the rich string is corrupted, if PE sections are misaligned or outside of file boundaries, if an image size of the file is misaligned or miscalculated, if reserved fields are used in the PE header, or if any sections have an empty name or includes unprintable characters, or based on a combination of factors. Performing both rule-based classification and anomaly-based classification together may reduce the rate of false negatives because one classification method may detect a malicious file that the other method misses.

The above-described system and processes beneficially enables reliable detection and remediation of anomalous files. By relying on anomaly scores generated based on samples of known non-anomalous or clean files, along with information from the above-described security server 105, the protection application 136 can classify different instances of anomalous files that may be associated with malware on a client 120.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for detecting anomalous files, the method comprising: obtaining a file on a client for classification; obtaining metadata associated with the file; determining, based on the metadata, a subclass of the file selected from a plurality of subclasses; selecting a model of a plurality of models based on the subclass of the file, wherein the selected model characterizes a plurality of features of a sample of clean files that are each associated with the subclass, wherein each of the plurality of models is derived from a training set of clean files belonging to a particular subclass and wherein different ones of the plurality of models are associated with different subclasses; generating, by a processor, an anomaly score of the file by applying the file to the selected model, the anomaly score indicating a level of dissimilarity between features of the file and the plurality of features of the sample of clean files of the selected model; comparing the anomaly score against at least one of a lower threshold score, a center threshold score, and an upper threshold score; classifying the file as anomalous based on the anomaly score; and remediating the file by the client responsive to the classification of the file.

2. The method of claim 1, wherein obtaining the file on the client comprises:
applying a filter to a plurality of files to filter out files having characteristics indicative of clean files; and
selecting the file from the plurality of files on the client responsive to the file passing through the filter.

3. The method of claim 2, further comprising:
selecting the filter based on the subclass of the file.

4. The method of claim 1, wherein generating the anomaly score further comprises:
deriving the features of the file;
determining distances between the features of the file and the plurality of features of the sample of clean files; and
generating the anomaly score as a combination of the distances.

5. The method of claim 1, wherein classifying the file as anomalous comprises:
determining that the anomaly score is greater than a threshold score;
responsive to the determination, providing the file to a security server for comparison against a whitelist of known clean files; and
classifying the file as anomalous responsive to receiving an indication from the security server that the file is not on the whitelist.

6. The method of claim 1, wherein classifying the file as anomalous comprises:
determining that the anomaly score is less than a threshold score;
responsive to the determination, providing the file to a security server for comparison against a blacklist of known malware; and
classifying the file as anomalous responsive to receiving an indication from the security server that the file is on the blacklist.

7. The method of claim 1, wherein classifying the file as anomalous comprises: responsive to determining that the anomaly score is greater than the center threshold score and less than the upper threshold score, providing the file to a security server for comparison against a whitelist of known clean files; responsive to determining that the anomaly score is less than the center threshold score and greater than the lower threshold score, providing the file to the security server for comparison against a blacklist of known malware files; and classifying the file as anomalous responsive to determining that (i) the anomaly score is greater than the upper threshold, (ii) the anomaly score is between the center threshold score and the upper threshold score and is not on the whitelist, or (iii) the anomaly score is between the center threshold score and the lower threshold score and is on the blacklist.

8. A non-transitory computer-readable storage medium storing instructions for detecting anomalous files, the instructions when executed by a processor causing the processor to perform steps including: obtaining a file on a client for classification; obtaining metadata associated with the file; determining, based on the metadata, a subclass of the file selected from a plurality of subclasses; selecting a model of a plurality of models based on the subclass of the file, wherein the selected model characterizes a plurality of features of a sample of clean files that are each associated with the subclass, wherein each of the plurality of models is derived from a training set of clean files belonging to a particular subclass and wherein different ones of the plurality of models are associated with different subclasses; generating an anomaly score of the file by applying the file to the selected model, the anomaly score indicating a level of dissimilarity between features of the file and the plurality of features of the sample of clean files of the selected model; comparing the anomaly score against at least one of a lower threshold score, a center threshold score, and an upper threshold score; classifying the file as anomalous based on the anomaly score; and remediating the file by the client responsive to the classification of the file.

9. The non-transitory computer-readable storage medium of claim 8, wherein obtaining the file on the client comprises:
applying a filter to a plurality of files to filter out files having characteristics indicative of clean files; and
selecting the file from the plurality of files on the client responsive to the file passing through the filters.

10. The non-transitory computer-readable storage medium of claim 8, wherein generating the anomaly score further comprises:
deriving the features of the file;
determining distances between the features of the file and the plurality of features of the sample of clean files; and
generating the anomaly score as a combination of the distances.

11. The non-transitory computer-readable storage medium of claim 8, wherein classifying the file as anomalous comprises:
   determining that the anomaly score is greater than a threshold score;
   responsive to the determination, providing the file to a security server for comparison against a whitelist of known clean files; and
   classifying the file as anomalous responsive to receiving an indication from the security server that the file is not on the whitelist.

12. The non-transitory computer-readable storage medium of claim 8, wherein classifying the file as anomalous comprises:
   determining that the anomaly score is less than a threshold score;
   responsive to the determination, providing the file to a security server for comparison against a blacklist of known malware; and
   classifying the file as anomalous responsive to receiving an indication from the security server that the file is on the blacklist.

13. A computing system comprising: a processor; and a non-transitory computer-readable storage medium storing instructions for generating information for detecting anomalous files, the instructions when executed by the processor causing the processor to perform steps including: obtaining a file on a client for classification; obtaining metadata associated with the file; determining, based on the metadata, a subclass of the file selected from a plurality of subclasses; selecting a model of a plurality of models based on the subclass of the file, wherein the selected model characterizes a plurality of features of a sample of clean files that are each associated with the subclass, wherein each of the plurality of models is derived from a training set of clean files belonging to a particular subclass and wherein different ones of the plurality of models are associated with different subclasses; generating an anomaly score of the file by applying the file to the selected model, the anomaly score indicating a level of dissimilarity between features of the file and the plurality of features of the sample of clean files of the selected model; comparing the anomaly score against at least one of a lower threshold score, a center threshold score, and an upper threshold score; classifying the file as anomalous based on the anomaly score; and remediating the file by the client responsive to the classification of the file.

14. The system of claim 13, wherein obtaining the file on the client comprises:
   applying a filter to a plurality of files to filter out files having characteristics indicative of clean files; and
   selecting the file from the plurality of files on the client responsive to the file passing through the filters.

15. The system of claim 13, wherein generating the anomaly score further comprises:
   deriving the features of the file;
   determining distances between the features of the file and the plurality of features of the sample of clean files; and
   generating the anomaly score as a combination of the distances.

16. The method of claim 3, wherein each of the plurality of different subclasses indicates a file source, and wherein each of the plurality of models is derived from a training set of clean files from the file source indicated by the associated subclass.

17. The method of claim 1, wherein a first model of the plurality of models is derived from a first training set of clean files download from an online service file source, and wherein a second model of the plurality of models is derived from a second training set of clean files obtained from a local disk file source.

* * * * *